US010247362B2

(12) United States Patent
Carron et al.

(10) Patent No.: US 10,247,362 B2
(45) Date of Patent: Apr. 2, 2019

(54) VALVE FOR A PRESSURIZED FLUID CYLINDER AND CORRESPONDING CYLINDER

(71) Applicant: L'Air Liquide, Société Anonyme pour l'Etude et l'Exploitation des Procédés Georges Claude, Paris (FR)

(72) Inventors: Amélie Carron, Paris (FR); Beatriz Lopez, Paris (FR); Christophe Roland Rezel, Savigny sur Orge (FR); Philippe Rudnianyn, Villiers sur Orge (FR); Catherine Vivier, Saint-Egreve (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 235 days.

(21) Appl. No.: 15/113,092

(22) PCT Filed: Nov. 26, 2014

(86) PCT No.: PCT/FR2014/053045
§ 371 (c)(1),
(2) Date: Jul. 21, 2016

(87) PCT Pub. No.: WO2015/110718
PCT Pub. Date: Jul. 30, 2015

(65) Prior Publication Data
US 2017/0002981 A1 Jan. 5, 2017

(30) Foreign Application Priority Data

Jan. 22, 2014 (FR) ..................... 14 50526

(51) Int. Cl.
*F17C 13/02* (2006.01)
*F17C 1/00* (2006.01)
*F17C 13/04* (2006.01)

(52) U.S. Cl.
CPC .............. *F17C 13/025* (2013.01); *F17C 1/00* (2013.01); *F17C 13/04* (2013.01);
(Continued)

(58) Field of Classification Search
None
See application file for complete search history.

(56) References Cited

U.S. PATENT DOCUMENTS

| 6,012,411 A | 1/2000 | Hochbrueckner |
| 6,098,646 A | 8/2000 | Hennemann et al. |

(Continued)

FOREIGN PATENT DOCUMENTS

| EP | 2 110 949 | 10/2009 |
| EP | 2 339 222 | 6/2011 |

(Continued)

OTHER PUBLICATIONS

French Search Report and Written Opinion for corresponding FR 1450526, dated Oct. 24, 2013.

(Continued)

*Primary Examiner* — Tuan C Dao
(74) *Attorney, Agent, or Firm* — Elwood L. Haynes (57) ABSTRACT

The invention relates to a pressurized fluid cylinder, a member for acquiring, storing and processing data, and at least one data display device. The valve comprises a sensor which detects the position of a manual control member, and a pressure sensor for measuring the pressure inside the storage space of a fluid cylinder. The data acquisition, storage and processing member is designed to: calculate an actual value for the amount of fluid remaining and/or drawn off; calculate a theoretical value for the amount of fluid remaining and/or drawn of on the basis of the regulation performed by the regulating member and measured by the position of the control member compare the actual value (Continued)

based on the measurement of the pressure sensor with the theoretical value; and generate a warning signal if the difference between these actual and theoretical values is greater than a specific safety threshold.

13 Claims, 2 Drawing Sheets

(52) U.S. Cl.
CPC .......................... *F17C 2201/0109* (2013.01); *F17C 2201/032* (2013.01); *F17C 2201/058* (2013.01); *F17C 2205/0326* (2013.01); *F17C 2221/011* (2013.01); *F17C 2223/0123* (2013.01); *F17C 2250/032* (2013.01); *F17C 2250/034* (2013.01); *F17C 2250/036* (2013.01); *F17C 2250/043* (2013.01); *F17C 2250/0408* (2013.01); *F17C 2250/0439* (2013.01); *F17C 2250/0491* (2013.01); *F17C 2250/0495* (2013.01); *F17C 2250/0694* (2013.01); *F17C 2250/075* (2013.01); *F17C 2250/077* (2013.01); *F17C 2260/028* (2013.01); *F17C 2260/038* (2013.01); *F17C 2270/025* (2013.01)

(56) References Cited

U.S. PATENT DOCUMENTS

| | | |
|---|---|---|
| 6,518,749 B1 | 2/2003 | Oudet et al. |
| 2004/0045608 A1 | 3/2004 | Peters et al. |
| 2005/0103342 A1 | 5/2005 | Jorczak et al. |
| 2008/0150739 A1 | 6/2008 | Gamard |
| 2009/0050218 A1 | 2/2009 | Burgess et al. |
| 2010/0132474 A1 | 6/2010 | Bleys et al. |
| 2010/0245098 A1 | 9/2010 | Kanie |
| 2011/0140850 A1* | 6/2011 | Wassel ............... F17C 13/021 340/8.1 |
| 2012/0315837 A1* | 12/2012 | Olander ............. B01D 53/04 454/239 |
| 2014/0151589 A1* | 6/2014 | Cox ..................... G01D 5/145 251/129.1 |
| 2014/0152468 A1* | 6/2014 | Obenchain ............ A61M 16/20 340/870.09 |

FOREIGN PATENT DOCUMENTS

| | | |
|---|---|---|
| FR | 2 868 160 | 9/2005 |
| FR | 2 915 798 | 11/2008 |
| GB | 2 486 018 | 6/2012 |
| WO | WO 2005 093377 | 10/2005 |
| WO | WO 2012 164240 | 12/2012 |

OTHER PUBLICATIONS

French Search Report and Written Opinion for related FR 1450524, dated Oct. 24, 2013.
French Search Report and Written Opinion for related FR 1450525, dated Oct. 24, 2013.
French Search Report and Written Opinion for related FR 1450527, dated Oct. 23, 2013.
French Search Report and Written Opinion for related FR 1450528, dated Oct. 24, 2013.
International Search Report and Written Opinion for corresponding PCT/FR2014/053045, dated Mar. 18, 2015.
International Search Report and Written Opinion for related PCT/FR2014/053044, dated Mar. 18, 2015.
International Search Report and Written Opinion for related PCT/FR2014/053460, dated Mar. 18, 2015.
International Search Report and Written Opinion for related PCT/FR2014/053124, dated Mar. 5, 2015.
International Search Report and Int'l Preliminary Report on Patentability for related PCT/FR2015/050011, dated Mar. 18, 2015.

* cited by examiner

VALVE FOR A PRESSURIZED FLUID CYLINDER AND CORRESPONDING CYLINDER

CROSS REFERENCE TO RELATED APPLICATIONS

This application is a 371 of International PCT Application PCT/FR2014/053045 filed Nov. 26, 2014, which claims priority to French Patent Application No. FR 1450526 filed Jan. 22, 2014, the entire contents of which are incorporated herein by reference.

BACKGROUND

The present invention relates to a valve for a pressurized fluid cylinder and to a corresponding cylinder.

SUMMARY

The invention relates more particularly to a valve for a pressurized fluid cylinder, comprising a body provided with an end intended to be mounted in the orifice of a pressurized fluid cylinder, the body of the valve accommodating a first withdrawing circuit comprising a first, upstream end intended to communicate with the storage volume of a pressurized fluid cylinder and a second, downstream end intended to be connected to a consumer of the withdrawn gas, the first withdrawing circuit comprising a member for regulating the flow rate and/or the pressure of the withdrawn fluid between the upstream end and the downstream end, the valve comprising a member for manually controlling the regulating member, the control member being mounted so as to be able to move relative to the body of the valve and cooperating with the regulating member to control the flow rate and/or pressure of fluid allowed to circulate from the upstream end to the downstream end depending on the position of the control member with respect to the body, the valve comprising an electronic device for indicating data relating to the fluid content in a cylinder connected to the valve, the electronic indicating device comprising a member for acquiring, storing and processing data and at least one data display connected to the member for acquiring, storing and processing data, the valve having a sensor for sensing the position of the member for manually controlling the regulating member, the position sensor being connected to the member for acquiring, storing and processing data in order to transmit to the latter a signal indicative of the fluid flow rate and/or pressure set by the regulating member, the member for acquiring, storing and processing data being configured to cause an information item relating to the mode of use of the valve and in particular the fluid content and/or the quantity of fluid withdrawn to be displayed on the display in response to the reception of this set flow rate and/or pressure signal, the valve having a pressure sensor intended to measure the pressure within the storage volume of a fluid cylinder connected to the valve, the pressure sensor being connected to the member for acquiring, storing and processing data in order to transmit to the latter a signal indicative of the measured fluid pressure.

The invention relates to a valve provided with an electronic device for indicating physical data relating to the content notably of pressurized gas in a pressurized fluid cylinder. The invention relates notably to a device known as an electronic digital pressure gage device. Reference may be made for example to the document FR2868160A1, which describes an example of such a device.

Such a device comprises a pressure sensor and an electronic logic which calculates and displays the data relating to the quantity of fluid and/or to autonomy.

In order to calculate and display such reliable autonomy information, the device has to take several successive pressure measurements before evaluating the flow rate selected by the valve user. This causes a calculating time which does not make it possible to immediately display a selected autonomy or withdrawing rate. Thirty to sixty seconds may be necessary, for example. In addition, this device also has an identical reaction time if the withdrawing parameters are changed (change in the selected withdrawing rate, etc.).

The document WO2012164204A1 describes such a device, which uses the detection of the position of the flow rate selector.

The valve is used to supply oxygen to a medical ventilator (withdrawing rate set by the ventilator), the pressure signal measured by the pressure gage undergoing a phase oscillation with the ventilation phases. On account of the great variety of ventilation modes, it is difficult to calculate or display a relevant information item.

Moreover, these devices do not make it possible to signal and manage certain hazardous situations, notably when the user imperfectly selects a withdrawing flow rate via the manual control member or in the event of an error in calculating the autonomy on account of a leak or some other technical problem.

It is an aim of the present invention to remedy all or some of the abovementioned drawbacks of the prior art.

To this end, the cylinder according to the invention, which is otherwise in accordance with the generic definition thereof given in the preamble above, is essentially characterized in that the member for acquiring, storing and processing data is configured to receive both the signal of pressure measured by the pressure sensor and the flow rate and/or pressure signal supplied by the position sensor and to calculate, in response, a value of the quantity of remaining fluid and/or withdrawn fluid from these two signals, the member for acquiring, storing and processing data being configured to:
- calculate an actual value of the quantity of remaining fluid and/or withdrawn fluid on the basis of the pressure measurement by the pressure sensor,
- calculate a theoretical value of the quantity of remaining fluid and/or withdrawn fluid on the basis of the regulation set by the regulating member and measured by the position of the control member,
- compare said actual value based on the measurement by the pressure sensor with the theoretical value set by the regulating member, and
- generate a warning signal if these theoretical and actual values diverge to an extent greater than a given safety threshold.

This makes it possible to rapidly and automatically indicate to the user that gas is being withdrawn, either on account of a medical ventilator being supplied, or on account of a leak.

Moreover, embodiments of the invention can include one or more of the following features:
- the value of the quantity of remaining fluid and/or withdrawn fluid comprises at least one of: the pressure of the fluid, the quantity of fluid by mass or volume, the autonomy of fluid remaining in the cylinder, the variation in the quantity or pressure of fluid in the cylinder, the withdrawn fluid flow rate, the autonomy of remaining fluid in quantity, the temporal autonomy of remaining fluid at a given withdrawing flow rate, the safety threshold corresponds to a divergence of 15 to 35% and preferably 25% between the actual and theoretical values, the member for acquiring, storing and processing data is configured to calculate the theoretical autonomy of remaining fluid from the initial pressure measured, from the theoretical decrease over time in pressure or the quantity of gas generated by the withdrawing flow rate and/or pressure set by the regulating member, and to calculate the actual autonomy of remaining fluid from the initial pressure measured and the actual decrease over time in pressure or the quantity of gas measured by the pressure sensor, the member for acquiring, storing and processing data is configured to calculate an information item relating to the autonomy or content of fluid over a given period of time of between one second and ten minutes and preferably between two seconds and one minute, from the current pressure and the theoretical decrease over time in pressure or the quantity of gas set by the regulating member, the member for acquiring, storing and processing data is configured to calculate a value relating to the autonomy or content of fluid over a given period of time of between thirty seconds and ten minutes and preferably between one minute and six minutes, from the signal of pressure measured by the pressure sensor, the member for acquiring, storing and processing data is configured to sense the pressure measured by the pressure sensor for a time of between 1 ms (millisecond) and 100 ms every 5 s (seconds) to 60 s, the member for acquiring, storing and processing data is configured to sense the position of the manual control member (5) measured by the position sensor for a time of between 1 ms and 50 ms every 1 to 20 seconds, the theoretical value relating to the autonomy or content of fluid remaining in the cylinder is expressed in time remaining (or, respectively, in quantity remaining) by dividing the initial pressure measured by the pressure sensor (or, respectively, a quantity of gas flowing) by the theoretical variation in pressure set by the regulating member (or, respectively, the variation in quantity set by the regulating member), by a formula of the type: Time remaining=Initial pressure/variation in pressure set (or, respectively: Time remaining=Remaining quantity/variation in quantity set), the quantity being estimated via the perfect gas equation ($PV=nRT$) or real gas equation ($PV=ZnRT$) (S.I. units), where P is the pressure measured, V the known volume of the cylinder, n the quantity, R the perfect gas constant and T the temperature measured or approximated to the ambient temperature measured, Z the compressibility factor known from a table or calculation, the member for acquiring, storing and processing data is configured to recalculate and optionally display automatically an update of the value relating to the autonomy or content of fluid on receiving a signal from the position sensor indicating a change in fluid flow rate and/or pressure set by the regulating member via the control member, the sensor for sensing the position of the control member comprises at least one of: a capacitive sensor, a magnetic sensor, a mechanical sensor, at least one of the components and notably one of the sensors (position sensor, pressure sensor) is of the electrical type and powered by a battery and/or an inductive system, said at least one component being able to be powered non-continuously in order to save energy, it being possible for the member for acquiring, storing and processing data to be configured to ensure this power supply when a measurement is taken.

The invention also relates to a pressurized fluid cylinder comprising a valve according to any one of the above or following features.

According to one possible particular feature, after the cylinder has been filled and before first withdrawal, the member for acquiring, storing and processing data is configured to cause a fixed information item relating to the fluid content in the cylinder to be displayed on the display until the position sensor transmits a signal indicative of a flow rate and/or the pressure of fluid withdrawn from the reservoir for a given time and/or corresponding to a given quantity of fluid.

The invention can also relate to any alternative device or method comprising any combination of the above or following features.

BRIEF DESCRIPTION OF THE DRAWINGS

Further particular features and advantages will become apparent from reading the following description, which is given with reference to the figures, in which:

FIG. 1 shows a schematic and partial side view illustrating a valve mounted on a pressurized gas cylinder according to one possible exemplary embodiment of the invention, FIG. 2 schematically and partially illustrates the structure and operation of a part of the valve from FIG. 1, FIGS. 3 to 5 schematically and partially illustrate the structure and operation of three respective examples of position sensors of a valve according to the invention, FIG. 6 schematically shows two curves illustrating examples of signals generated by one or more position sensors from FIG. 5, FIGS. 7 and 8 schematically and partially illustrate the structure and operation of a fourth example and a fifth example, respectively, of a position sensor of the valve according to the invention, FIG. 9 schematically shows an example of a pressure curve measured over time.

Figures 1, 2:
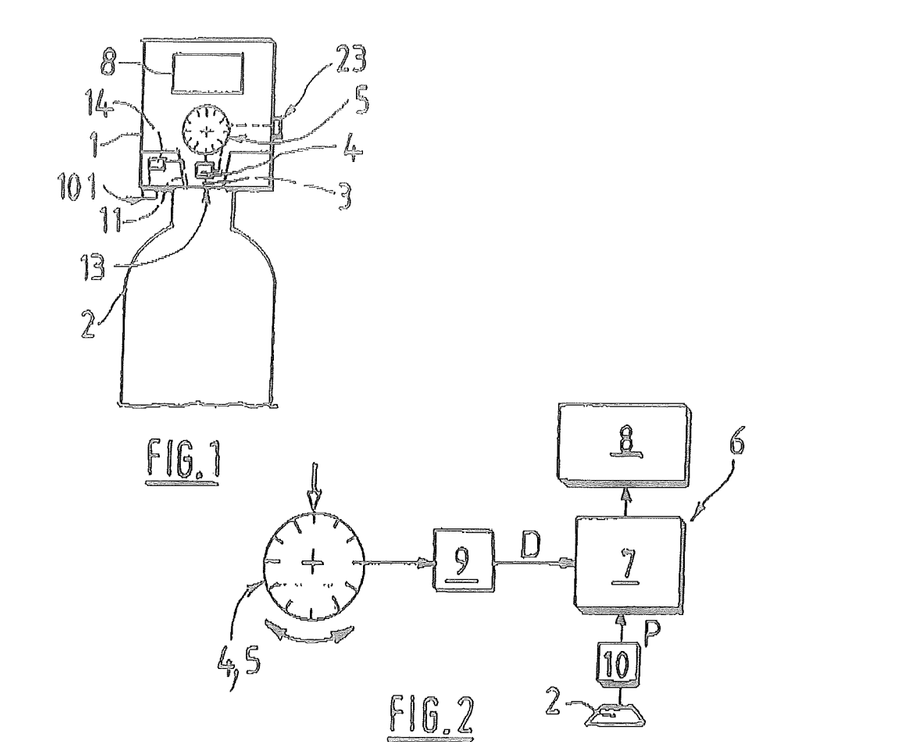

FIG. 1 schematically shows a pressurized gas cylinder 2 provided with a valve 1 that is able to implement the invention.

DESCRIPTION OF PREFERRED EMBODIMENTS

The valve 1 comprises a body provided with an end intended to be mounted in the orifice of a pressurized fluid cylinder 2 (for example by screwing).

In a conventional manner, the body of the valve 1 accommodates a first withdrawing circuit 3 comprising a first, upstream end 13 communicating with the storage volume of the cylinder 2. The withdrawing circuit 3 comprises a second, downstream end 23 intended to be connected to a consumer of the withdrawn gas (for example a patient in the case of oxygen or some other medical gas).

The first withdrawing circuit 3 comprises a member 4 for regulating the flow rate and/or the pressure of the withdrawn fluid between the upstream end 13 and downstream end 23. This regulating member 4 is for example a flow rate regulator having calibrated orifices 16, making it possible to select a withdrawn gas flow rate (cf. the schematic depiction in FIG. 3). Of course, any other regulating member is conceivable, for example a valve with a proportional opening.

The valve 1 comprises a member 5 for manually controlling the member 4. The control member 5 is mounted so as to be able to move relative to the body of the valve 1 and cooperates with the regulating member 4 to control the flow rate and/or pressure of fluid allowed to circulate depending on the position of the control member 5 with respect to the body of the valve. The control member 5 comprises for example a rotary hand wheel. Of course, any other appropriate system is conceivable (pivoting lever, digital control, wireless control via a remote control, etc.). For example, the control member 5 selects a calibrated orifice and/or controls a flow rate restriction valve depending on its position among a plurality of separate stable positions or a plurality of positions of a continuous movement. In particular the stable positions can be mechanically referenced by a hard point (for example via a detent system).

The valve 1 comprises an electronic device 6 for indicating data relating to the content of fluid in a cylinder 2 connected to the valve 1. The device can be of the type comprising a member 7 for acquiring, storing and processing data and at least one data display 8 connected to the member 7 for acquiring, storing and processing data. The member 7 for acquiring, storing and processing data comprises for example a computer and/or a microprocessor or any other equivalent system.

Of course, this device can have one or more data receiving members (via a wired and/or wireless connection) and also one or more data output members (via a wired and/or wireless connection).

The valve 1 has a sensor 9 for sensing the position of the member 5 for manually controlling the regulating member 4. The position sensor 9 is connected to the member 7 for acquiring, storing and processing data in order to transmit to the latter a signal indicative of the fluid flow rate and/or pressure set by the regulating member 4. For example, the sensor 9 for sensing the position of the control member 5 comprises a converter for converting the mechanical movement of the control member into an electrical signal that is exploitable by the member 7 for acquiring, storing and processing data.

The detector is for example secured to a fixed part of the valve or, respectively, the control member, the detector outputting an electrical or digital signal determined depending on the position of the control member 5. This signal can be output in a wired and/or wireless manner.

The sensor 9 for sensing the position of the control member 5 can comprise for example at least one of: a capacitive sensor, a magnetic sensor, a mechanical sensor, an optical sensor.

The manual control member 5 and/or the regulating member 4 may be able to move into a plurality of separate positions (which are or are not mechanically stable) that correspond to respective flow rate and/or pressure values of fluid allowed to pass from the upstream end 13 to the downstream end (with a scale for example).

As illustrated in FIG. 2, the valve also has a pressure sensor 10 intended to measure the pressure within the storage volume of the cylinder 2. The pressure sensor 10 is connected to the member 7 for acquiring, storing and processing data in order to transmit to the latter (in a wired and/or wireless manner) a signal indicative of the fluid pressure measured, notably in real time or periodically. The pressure sensor 10 can be situated for example at the upstream end of the first withdrawing circuit 3 and/or at a second withdrawing circuit 11.

The member 7 for acquiring, storing and processing data is configured to calculate and display on the display 8 an information item relating to autonomy and/or remaining content and/or flow rate withdrawn.

In addition, the member 7 for acquiring, storing and processing data can be configured to cause an information item relating to the fluid flow rate and/or pressure set by the regulating member 4 to be displayed on the display 8 in response to the reception of this set flow rate and/or pressure signal.

The member 7 for acquiring, storing and processing data is thus configured to receive both the signal of pressure P measured by the pressure sensor 10 and the flow rate and/or pressure D signal supplied by the position sensor 9. The member 7 for acquiring, storing and processing data can thus be programmed to calculate from these two information items an information item relating to autonomy of remaining fluid or the flow rate withdrawn.

The theoretical autonomy of remaining fluid is determined for example by calculating, from the initial pressure measured, the theoretical decrease over time in pressure or the quantity of gas generated by the withdrawing flow rate and/or pressure D set by the regulating member 4.

The actual autonomy of remaining fluid can be calculated only on the basis of values of pressure measured by the pressure sensor 10.

In addition, preferably, the member 7 for acquiring, storing and processing data is configured to:
  calculate the actual variation in fluid quantity or pressure measured by the pressure sensor 10,
  calculate the theoretical variation in fluid quantity or pressure set by the regulating member 4,
  compare the actual variation in quantity or pressure measured by the pressure sensor 10 with the theoretical variation in quantity or pressure set by the regulating member 4, and
  generate a warning signal if the theoretical and actual variations diverge to an extent greater than a given safety threshold (for example diverge by 15 to 30%, and notably 25%).

These variations in quantity/pressure measured can, if need be, be used to calculate the flow rate of gas actually withdrawn.

The theoretical information relating to the autonomy or content of fluid remaining in the cylinder 2 can be expressed in time remaining (or, respectively, in quantity remaining) by dividing the initial pressure measured by the pressure sensor 10 (or, respectively, a quantity of gas flowing) by the theoretical variation in pressure set by the regulating member 4 (or, respectively, the variation in quantity set by the regulating member 4), by a formula for example of the type: Time remaining=Initial pressure/variation in pressure set (or, respectively: Time remaining=Remaining fluid content/variation in quantity set).

In the same way, the actual information relating to autonomy can be expressed in time remaining (or, respectively, in quantity remaining) by dividing the initial pressure measured by the pressure sensor 10 (or, respectively, a quantity of gas flowing) by the actual variation in pressure measured by the pressure sensor 10 (or, respectively, the variation in quantity calculated from the pressure P measured), by a formula for example of the type: Time remaining=Initial pressure/variation in actual pressure (or, respectively: Time remaining=Remaining fluid content/variation in quantity measured).

The theoretical variations in quantity or pressure can be calculated for example via the perfect gas equation $PV=nRT$ or real gas equation $PV=ZnRT$ (S.I. units), where P is the pressure measured, V the known volume of the cylinder, n the quantity, R the perfect gas constant and T the temperature measured or approximated to the ambient temperature measured, Z the compressibility factor presumed to be known (table or calculation). Similarly, the conversions between pressure and quantity can be calculated via the perfect gas equation or any other equivalent formula, the volume of the cylinder 2 being known and entered in the member 7 for acquiring, storing and processing data and the temperature can be measured by an ambient external sensor or calculated or entered or approximated.

The device preferably has a temperature sensor inside or outside the cylinder to correct the calculation of autonomy.

The member 7 for acquiring, storing and processing data can be configured to calculate an information item relating to the autonomy or content of fluid over a given period of time of between fifteen seconds and ten minutes, and preferably between thirty seconds and five minutes, from the signal of pressure measured by the pressure sensor 10.

The member 7 for acquiring, storing and processing data is preferably configured to periodically compare this autonomy information calculated on the basis of the measured pressure P signal with the theoretical autonomy information calculated from the variation in quantity or pressure set by the regulating member 4.

The dynamic pressure measurement can make it possible to adjust the display of the effective flow rate withdrawn and/or the autonomy displayed more precisely, if necessary.

If need be, a (visible and/or audible and/or wireless) warning signal can be output in the event of a divergence or an anomaly.

Similarly, the member 7 for acquiring, storing and processing data can be configured to recalculate and optionally display automatically an update of the information relating to the autonomy, content or flow rate of fluid on receiving a signal from the position sensor 9 indicating a change in fluid flow rate and/or pressure set by the regulating member 4 via the control member 5.

This update information (notably the result of the new autonomy calculation) can be displayed either regularly and automatically, for example every 5 minutes to 20 minutes (even if the difference is small), or is only displayed when the difference is relatively large (for example a difference of at least 5% or at least 15%). In order to calculate the remaining gas autonomy from such a signal, the member 7 for acquiring, storing and processing data can be configured to measure the pressure drop over the optima in order to deduce therefrom the equivalent rate of decrease (cf. reference 15 in FIG. 9). Alternatively or in addition, the member 7 for acquiring, storing and processing data can be configured to work out the average drop in pressure over a relatively long time (several minutes, for example ten minutes) so as to remove image inaccuracies.

Preferably, the member 5 for manually controlling the regulating member 4 is movable into a position known as the "closed" position corresponding to closure of the first withdrawing circuit 3. In other words, the flow rate of fluid allowed to pass from the upstream end 13 to the downstream end 23 is zero. When the manual control member 5 is in its closed position and the variation in the signal indicative of the fluid pressure within a cylinder 2 is lower than a given variation threshold (for example equivalent to a pressure drop of 10 mbar/min (0.05 l/min) measured by the pressure sensor 10), the member 7 for acquiring, storing and processing data is preferably configured to cause a fixed information item relating to the pressure and/or quantity of fluid in the cylinder 2 to be displayed on the display 8.

In other words, the device detects that the cylinder 12 is not being emptied and displays for example an information item relating to its content.

As illustrated in FIG. 1, the valve 1 can comprise a second withdrawing circuit 11, for example separate from the first withdrawing circuit 3, which bypasses the flow rate and/or pressure regulating member 4 of the first withdrawing circuit 3.

If need be, this second withdrawing circuit 11 can have a portion in common with the first withdrawing circuit 3.

This second withdrawing circuit 11 is provided for example to supply a gas at a regulated pressure (via a pressure relief valve 14). For example, the second withdrawing circuit 11 supplies a variable or fixed pressure of around three to ten bar to a user appliance. For example, the second withdrawing circuit 11 has an outlet connection 101 (for example via a toothed connector) that can be connected to a medical ventilator in order to supply oxygen thereto.

This second withdrawing circuit 11 can supply gas from the cylinder 2 independently of the first withdrawing circuit 3. Thus, when the manual control member 5 is in its closed position and the variation in the signal indicative of the fluid pressure within a cylinder 2 (measured by the pressure sensor 10) is greater than a given variation threshold (for example 25 mbar per minute), the member 7 for acquiring, storing and processing data can detect withdrawal of fluid via the second withdrawing circuit 11 or, if this second withdrawing circuit 11 is not being used, a possible leak of fluid.

The member 7 for acquiring, storing and processing data can, if need be, cause an information item relating to withdrawal via the second withdrawing circuit 11 and or relating to a leak (warning signal) to be displayed on the display 8 or to be output (wirelessly, in a wired manner or audibly).

In particular, when the manual control member 5 is in its position known as the closed position and the variation in the signal indicative of the fluid pressure within a cylinder is greater than a given variation threshold (for example 25 mbar per minute), the member 7 for acquiring, storing and processing data is configured to detect at least one characteristic of the form of the variation in fluid pressure in the cylinder on account of the withdrawal via the second withdrawing circuit 11.

The at least one characteristic comprises for example: a periodic character of the variation in pressure or quantity, the frequency of the variation in pressure or quantity, the level of variation in pressure or quantity, etc.

Figure 9:
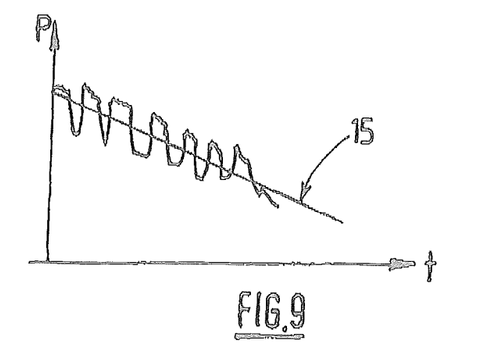

As illustrated schematically in FIG. 9, this makes it possible to instantaneously detect, at the end of two to three pressure oscillations, for example periodic withdrawal corresponding to a gas supply to a respiratory ventilator. Specifically, even if the gas withdrawn does not pass through the flow rate regulator 4, the flow rate is regulated directly by a ventilator and depends on the patient's breathing. This flow rate thus delivered is not constant but oscillates over time (depending on the patient's breathing).

The member 7 for acquiring, storing and processing data can be configured to detect (recognize) a drop in pressure characteristic of ventilation using the following principle:

measuring the pressure signal in a close periodic manner (for example every 0.5 to two seconds, notably every second), identifying a signal of the square wave type with a frequency of five to twenty-five square waves (respirations) per minute.

In the event that this pressure signal does not correspond to a ventilation signal (for example a continuous decreasing variation), the member 7 for acquiring, storing and processing data can determine that it is a leak or incorrect use of the gas, and can signal this in the same way.

According to one advantageous particular feature, when the manual control member 5 is disposed in an intermediate position between two respective adjacent flow rate and/or pressure values of fluid allowed to pass from the upstream end 13 to the downstream end 23, the member 7 for acquiring, storing and processing data is configured to select and display on the display 8 one or both of these adjacent values or an intermediate value between these two adjacent values or no numerical value.

Similarly, one of these two adjacent values or an intermediate value between these two adjacent values can be used for the theoretical calculation of a withdrawn flow rate or remaining quantity value as described above.

Preferably, the member 7 for acquiring, storing and processing data displays and/or signals the most critical or most unfavorable value for the user (wireless remote transmission or wired or audible transmission).

This makes it possible to ergonomically warn the user of incorrect manipulation by displaying relevant but disadvantageous information, obliging him to correct his selection.

For example, when the manual control member 5 is disposed in an intermediate position between two respective adjacent flow rate values, the member 7 for acquiring, storing and processing data is configured to calculate and display on the display 8 an information item relating to the autonomy or content of fluid remaining in the cylinder on the basis of the higher value of the two adjacent values.

Thus, if, for example, the user positions the control member 5 between the positions n liters per minute and n+1 liters per minute (n being an integer), the member 7 for acquiring, storing and processing data can be configured to calculate autonomy based on the withdrawn flow rate value of n+1 liters per minute (less autonomy than if it had been calculated with the value of n liters per minute).

Similarly, when the manual control member 5 is disposed in an intermediate position between two respective adjacent flow rate values, the member 7 for acquiring, storing and processing data can be configured to display on the display 8 an information item relating to the withdrawn flow rate set by the regulating member 4 that corresponds to the lower value of the two adjacent values. Thus, if, for example, the user positions the control member 5 between the positions n liters per minute and n+1 liters per minute (n being an integer), the member 7 for acquiring, storing and processing data can be configured to display on the display 8 an information item based on the withdrawn flow rate value of n liters per minute (the lower flow rate, which may for example be less than the medical prescription). This, in addition to or instead of an alarm, will cause the user to react so as to correct the flow rate selection. Alternatively, a range of values is displayed (the extremes of which correspond to these two adjacent values. Example "flow rate between n and n+1 liters per minute"). Alternatively, the member 7 for acquiring, storing and processing data removes the display of all or some of the information. This last solution will have even more of an effect on the user.

The device can be configured to deliver in this case a fluid flow rate corresponding to one of the two adjacent values, notably the displayed value.

Preferably, when the manual control member 5 is disposed in an intermediate position between two respective adjacent flow rate and/or pressure values of fluid allowed to pass from the upstream end 13 to the downstream end 23, the regulating member 4 is designed to allow the withdrawal of fluid at a non-zero flow rate between said two respective adjacent flow rate and/or pressure values, notably the value displayed.

Alternatively, when the manual control member 5 is disposed in an intermediate position between two respective adjacent flow rate and/or pressure values of fluid allowed to pass from the upstream end 13 to the downstream end 23, the regulating member 4 is designed to allow the withdrawal of fluid at a flow rate equal to one of said two respective adjacent flow rate and/or pressure values.

In addition, when the regulating member 4 makes it possible to vary the flow rate or pressure continuously (in a non-discrete manner), the member 7 for acquiring, storing and processing data can be configured to display the actual flow rate value selected.

Figure 3:
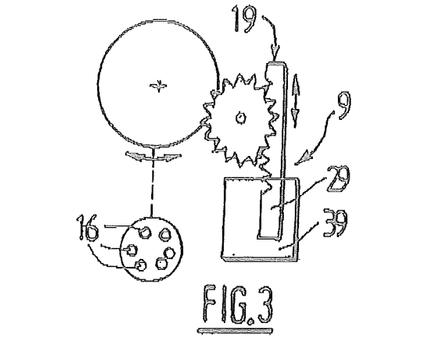

As illustrated in FIG. 3, the sensor 9 for sensing the position of the control member 5 can comprise for example a mechanism 19 that meshes with the control member 5 (a meshing and/or notching system) and a potentiometer 39. The mechanism has a moving part 29 (for example a wheel or a rod or a rack) that forms a wiper of the potentiometer 39. In this way, the position sensor 9 supplies a voltage and/or resistance value determined depending on the position of the control member 5.

Figure 4:
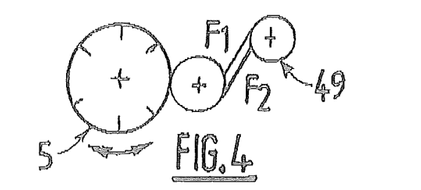

In the example in FIG. 4, the sensor 9 for sensing the position of the control member 5 comprises a mechanism that meshes with the control member 5 comprising an optical and/or digital encoder 49, for example a wired encoder (live wire and ground wire). The encoder 49 supplies a digital signal determined depending on the position of the control member 5. Depending on the position of the mechanism, one or more wires are live or short-circuited, forming a plurality of separate signals for characterizing different positions (for example $2^{n-1}$ for a system having n wires).

Figure 5:
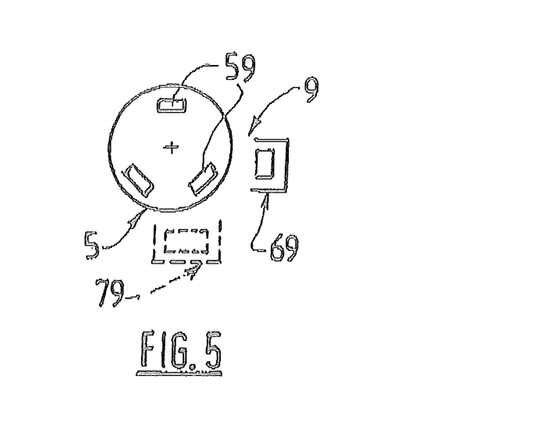
Figure 6:
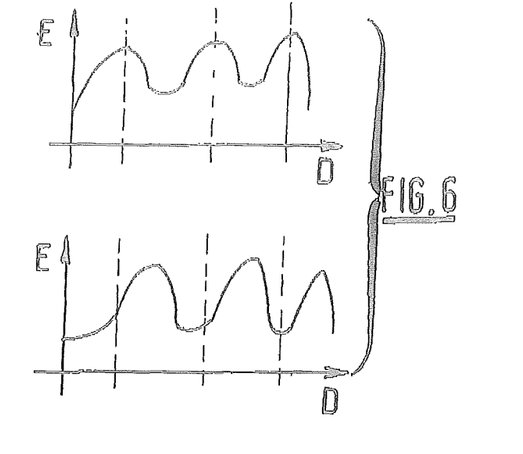

As illustrated in FIG. 5, the sensor 9 for sensing the position of the control member 5 can comprise a magnetic system having at least one magnet 59 secured to the control member 5 and at least one detector 69, 79 for detecting the magnetic field of the at least one magnet 59. If the control member 5 moves (such as by rotation), one detector 69 detects for example a magnetic field E depending on the movement D which oscillates and makes it possible to characterize a plurality of positions (cf. FIG. 6). When the device comprises a second detector 79 (or more), several separate signals can be exploited simultaneously in order to improve the detection of the separate positions.

Figure 7:
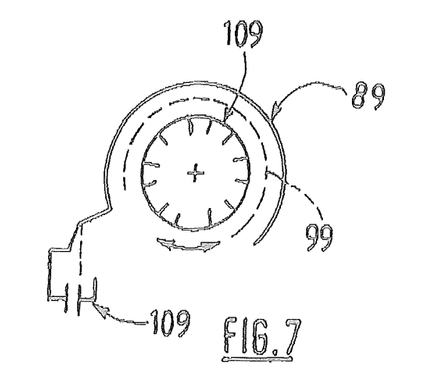
Figure 8:
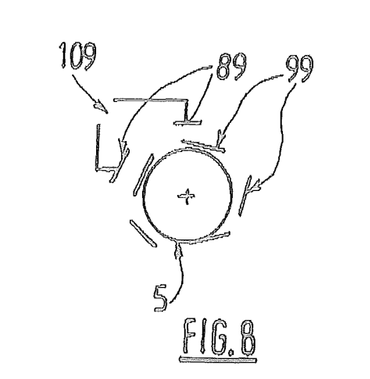

As illustrated in FIGS. 7 and 8, the sensor 9 for sensing the position of the control member 5 can comprise a capacitive system 109 that measures an electrical capacitance between a fixed magnetic reference 89 and a moving part 99 connected to the control member 5.

All of these systems have the advantage of reliable detection without the need to provide electric wires linked to a moving part of the mechanism.

The potentiometer system and more generally each detection system can be calibrated easily during production.

Thus, in this case, the simultaneous detection of the closed position (scale "0"="zero" for example) at the position detector 5 and a pressure drop, it is then possible to instantaneously and automatically detect the mode of use of the cylinder 2. A rapid autonomy calculation algorithm (based on the detected position of the control member 5) described below is not used, and only an autonomy calculation appropriate for this manner of withdrawal is carried out on the basis of the measurement of pressure P by the pressure sensor 10.

This autonomy calculation algorithm based on the pressure measurement 10 can then be initiated automatically.

Thus, when the manual control member 5 is in its closed position and the variation in the signal indicative of the fluid pressure within a cylinder 2 is greater than a given variation threshold, the member 7 for acquiring, storing and processing data can be configured to calculate an information item relating to the autonomy of remaining fluid from the single measurement of the initial-pressure signal and the variation in this pressure signal provided by the pressure sensor 10. The member 7 for acquiring, storing and processing data can notably be configured to cause this calculated autonomy information item and/or an information item relating to the initial quantity or pressure of fluid in the cylinder 2 to be displayed on the display 8.

In addition, the member 7 for acquiring, storing and processing data can be configured to have a guaranteed seal function indicating that the cylinder 2 has not been used after being filled. Thus, before first withdrawal, the member 7 for acquiring, storing and processing data can cause a fixed information item relating to the fluid content in the cylinder 2 (and/or the information item of the "cylinder full" type) to be displayed on the display 8 until the position sensor 9 transmits a signal indicative of a flow rate and/or the pressure of fluid withdrawn from the reservoir 2 for a given time and/or corresponding to a given quantity of fluid (for example 20 liters of gas withdrawn). This detection can be carried out or completed by the information provided by the pressure sensor 10.

Although the invention is relatively simple and inexpensive, it is easy to see that it makes it possible to display flow rate and autonomy information more quickly.

The invention applies advantageously to pressurized gas cylinders, notably cylinders containing pressurized oxygen.

The invention claimed is:

1. A valve for a pressurized fluid cylinder, comprising a body provided with an end configured to be mounted in the orifice of a pressurized fluid cylinder, the body of the valve accommodating a first withdrawing circuit comprising a first, upstream end configured to communicate with the storage volume of the pressurized fluid cylinder and a second, downstream end intended to be connected to a consumer of the withdrawn gas, the first withdrawing circuit comprising a member for regulating the flow rate and/or the pressure of the withdrawn fluid between the upstream end and the downstream end, the valve comprising a member for manually controlling the regulating member, the control member being mounted so as to be able to move relative to the body of the valve and cooperating with the regulating member to control the flow rate and/or pressure of fluid allowed to circulate from the upstream end to the downstream end depending on the position of the control member with respect to the body, the valve comprising an electronic device for indicating data relating to the fluid content in the pressurized fluid cylinder connected to the valve, the electronic indicating device comprising a member for acquiring, storing and processing data and at least one data display connected to the member for acquiring, storing and processing data, the valve having a sensor for sensing the position of the member for manually controlling the regulating member, the position sensor being connected to the member for acquiring, storing and processing data in order to transmit to the latter a signal indicative of the fluid flow rate and/or pressure set by the regulating member, the member for acquiring, storing and processing data being configured to cause an information item relating to the mode of use of the valve to be displayed on the display in response to the reception of this set flow rate and/or pressure signal, the valve having a pressure sensor configured to measure the pressure within the storage volume of the pressurized fluid cylinder connected to the valve, the pressure sensor being connected to the member for acquiring, storing and processing data in order to transmit to the latter a signal indicative of the measured fluid pressure, wherein the member for acquiring, storing and processing data is configured to receive both the signal of pressure measured by the pressure sensor and the flow rate and/or pressure signal supplied by the position sensor and to calculate, in response, a value of the quantity of remaining fluid and/or withdrawn fluid from these two signals, the member for acquiring, storing and processing data being configured to:

calculate an actual value of the quantity of remaining fluid and/or withdrawn fluid on the basis of the pressure measurement by the pressure sensor, calculate a theoretical value of the quantity of remaining fluid and/or withdrawn fluid on the basis of the regulation set by the regulating member and measured by the position of the control member, compare said actual value based on the measurement by the pressure sensor with the theoretical value set by the regulating member, and generate a warning signal if these theoretical and actual values diverge to an extent greater than a given safety threshold.

2. The valve of claim 1, wherein the value of the quantity of remaining fluid and/or withdrawn fluid is at least one member of group consisting of: the pressure of the fluid, the quantity of fluid by mass or volume, the autonomy of fluid remaining in the pressurized fluid cylinder, the variation in the quantity or pressure of fluid in the cylinder, the withdrawn fluid flow rate, the autonomy of remaining fluid in quantity, and the temporal autonomy of remaining fluid at a given withdrawing flow rate.

3. The valve of claim 1, wherein the safety threshold corresponds to a divergence of 15 to 35% between the actual and theoretical values.

4. The valve of claim 1, wherein the member for acquiring, storing and processing data is configured to calculate the theoretical autonomy of remaining fluid from the initial pressure measured, from the theoretical decrease over time in pressure or the quantity of gas generated by the withdrawing flow rate and/or pressure set by the regulating member, and to calculate the actual autonomy of remaining fluid from the initial pressure measured and the actual decrease over time in pressure or the quantity of gas measured by the pressure sensor.

5. The valve as of claim 1, wherein the member for acquiring, storing and processing data is configured to calculate an information item relating to the autonomy or content of fluid over a given period of time of between one second and ten minutes from the current pressure and the theoretical decrease over time in pressure or the quantity of gas set by the regulating member.

6. The valve of claim 1, wherein the member for acquiring, storing and processing data is configured to calculate a value relating to the autonomy or content of fluid over a given period of time of between thirty seconds and ten minutes from the signal of pressure measured by the pressure sensor.

7. The valve of claim 1, wherein the member for acquiring, storing and processing data is configured to sense the pressure measured by the pressure sensor for a time of between 1 ms (millisecond) and 100 ms every 5 s (seconds) to 60 s.

8. The valve of claim 1, wherein the member for acquiring, storing and processing data is configured to sense the position of the manual control member measured by the position sensor for a time of between 1 ms and 50 ms every 1 to 20 seconds.

9. The valve of claim 1, wherein the theoretical value relating to the autonomy or content of fluid remaining in the pressurized fluid cylinder is expressed in time remaining by dividing the initial pressure measured by the pressure sensor by the theoretical variation in pressure set by the regulating member, by a formula of the type: Time remaining=Initial pressure/variation in pressure set, the quantity being estimated via the perfect gas equation (PV=nRT) or real gas equation (PV=ZnRT), where P is the pressure measured, V the known volume of the pressurized fluid cylinder, n the quantity, R the perfect gas constant and T the temperature measured or approximated to the ambient temperature measured, Z the compressibility factor known from a table or calculation.

10. The valve of claim 1, wherein the member for acquiring, storing and processing data is configured to recalculate automatically an update of the value relating to the autonomy or content of fluid on receiving a signal from the position sensor indicating a change in fluid flow rate and/or pressure set by the regulating member via the control member.

11. The valve of claim 1, wherein the sensor for sensing the position of the control member comprises at least one of: a capacitive sensor, a magnetic sensor, or a mechanical sensor.

12. A pressurized fluid cylinder, comprising a valve as claimed in claim 1.

13. The cylinder of claim 12, wherein, after the cylinder has been filled and before first withdrawal, the member for acquiring, storing and processing data is configured to cause a fixed information item relating to the fluid content in the cylinder to be displayed on the display until the position sensor transmits a signal indicative of a flow rate and/or the pressure of fluid withdrawn from the reservoir for a given time and/or corresponding to a given quantity of fluid.

* * * * *